Sept. 13, 1955 H. L. LUBIN ET AL 2,717,448

RELATIVE MOTION ANALYZER

Filed Feb. 5, 1954 8 Sheets-Sheet 1

INVENTORS.
HILLIARD L. LUBIN
GILBERT C. FONDA
BY
Caesar and Rivise
ATTORNEYS

INVENTORS.
HILLIARD L. LUBIN
GILBERT C. FONDA
BY
Caesar and Rivise
ATTORNEYS.

Sept. 13, 1955 H. L. LUBIN ET AL 2,717,448

RELATIVE MOTION ANALYZER

Filed Feb. 5, 1954 8 Sheets-Sheet 3

INVENTORS.
HILLIARD L. LUBIN
GILBERT C. FONDA
BY
Caesar and Rivise
ATTORNEYS.

INVENTORS.
HILLIARD L. LUBIN
GILBERT C. FONDA
BY
Caesar and Rivise
ATTORNEYS.

INVENTORS.
HILLIARD L. LUBIN
GILBERT C. FONDA
BY
Caesar and Rivise
ATTORNEYS.

Sept. 13, 1955 H. L. LUBIN ET AL 2,717,448

RELATIVE MOTION ANALYZER

Filed Feb. 5, 1954 8 Sheets-Sheet 6

INVENTORS.
HILLIARD L. LUBIN
GILBERT C. FONDA
BY
Caesar and Rivise
ATTORNEYS.

Sept. 13, 1955 H. L. LUBIN ET AL 2,717,448

RELATIVE MOTION ANALYZER

Filed Feb. 5, 1954 8 Sheets-Sheet 7

INVENTORS.
HILLIARD L. LUBIN
GILBERT C. FONDA

BY *Caesar and Rivise*

ATTORNEYS.

RELATIVE MOTION ANALYZER

Filed Feb. 5, 1954 8 Sheets-Sheet 8

*INVENTORS.*
HILLIARD L. LUBIN
GILBERT C. FONDA
*BY*
Caesar and Rivise
ATTORNEYS.

United States Patent Office 2,717,448

Patented Sept. 13, 1955

2,717,448

RELATIVE MOTION ANALYZER

Hilliard L. Lubin, Staten Island, N. Y., and
Gilbert C. Fonda, Orange, N. J.

Application February 5, 1954, Serial No. 408,555

13 Claims. (Cl. 33—76)

This invention relates to a device for solving relative motion problems the primary object of which is to permit each problem to be solved at the location where it is happening with respect to the reference or solving vessel without the necessity of displacing the solution from the problem.

Another object of the invention is to provide a relative motion analyzer which is sufficiently versatile to solve a variety of problems. Thus, it will indicate the course and speed of a target vessel relative to the reference vessel. It will permit a determination of the course and speed required for the reference vessel to avoid the target vessel by whatever clearance the reference vessel desires. In the case of naval vessels, it will permit the maneuvering of the vessels to determine proper action for station changing. In the case of airplanes, it will solve wind drift problems because the device is essentially a three-vector analyzer.

Another object of the invention is to provide a relative motion analyzer, the basic principles of which can be incorporated in devices of widespread utility. Thus one device can be constructed with a transparent face plate for placement directly upon a radar console so that the scope picture below the device can be used for instantaneous target reference and recordation of target data on the face plate. Another device incorporating the principles of the present invention may be a hand model including a transparent face plate rotatably mounted on a base plate with a chart between them and rotatable with the face plate whereby information taken from a radar console can be placed on the face plate for solution. Yet another device incorporating the principles of the invention may merely include the interconnected vector arms mounted on a ring for placement on a radar console whereby the target data is plotted directly on the console.

Another object of the invention is to provide a relative motion analyzer employing a relative motion vector bar mounted upon a circular member for movement across an information source and incorporating means to releasably lock the same in a predetermined position, a target vessel vector bar and a reference vessel vector bar, all three bars being interconnected for sliding movement along their longitudinal axes, and means for releasably locking the bars in determined positions.

And yet another object of the invention is to provide a relative motion analyzer which may be inexpensively manufactured of extruded plastics, which is relatively simple in design and construction and which is easy to manipulate in use.

These and other objects of the invention will become more apparent as the following description proceeds in conjunction with the accompanying drawings, wherein.

Specific reference will now be made to the drawings wherein similar reference characters are used for corresponding elements throughout.

Figure 1:
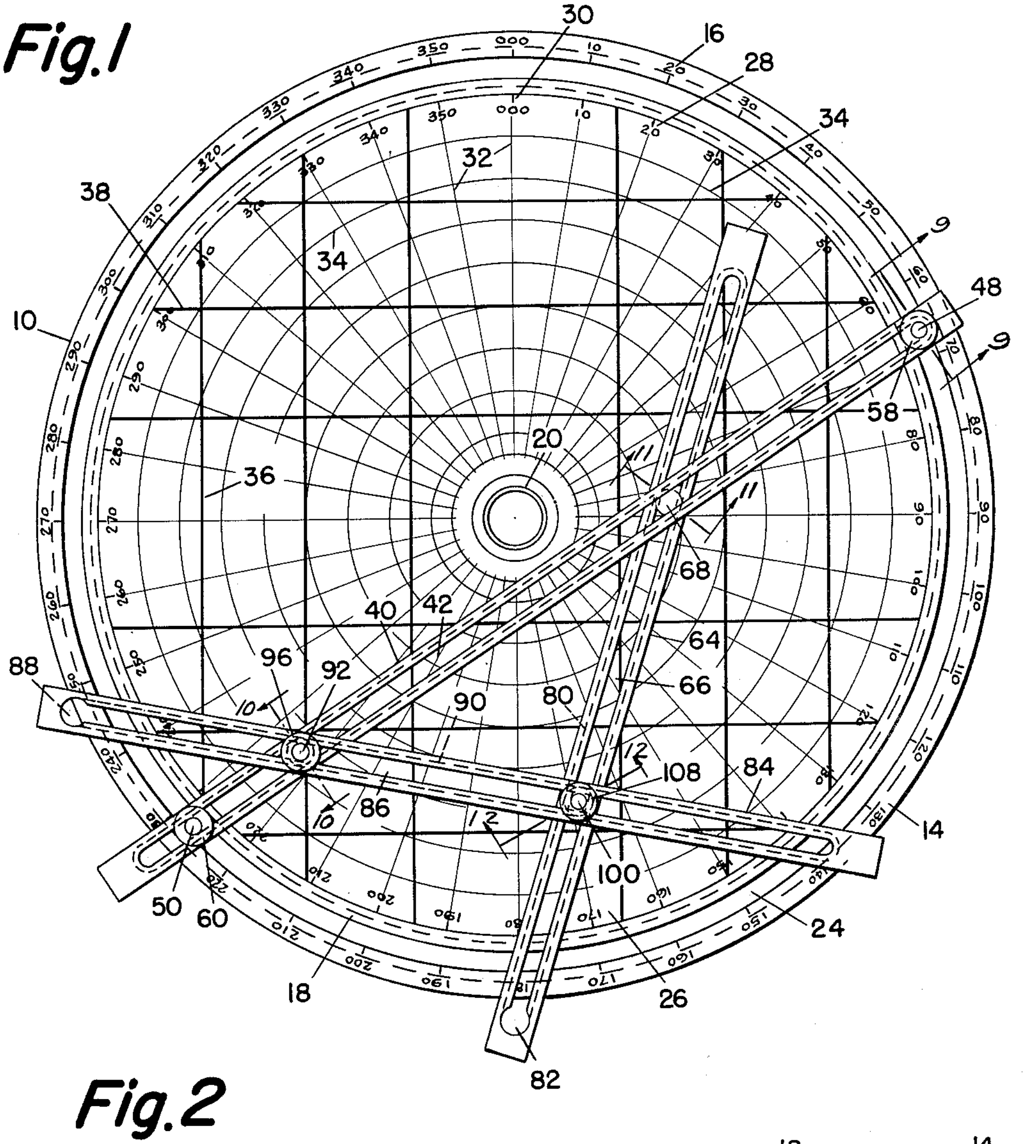
Figure 1 is a top plan view of the device.
Figure 2:
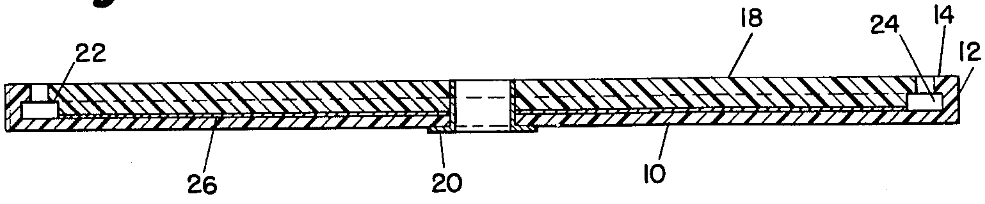
Figure 2 is a diametrical sectional view through the device with the vector bars removed.
Figure 3:
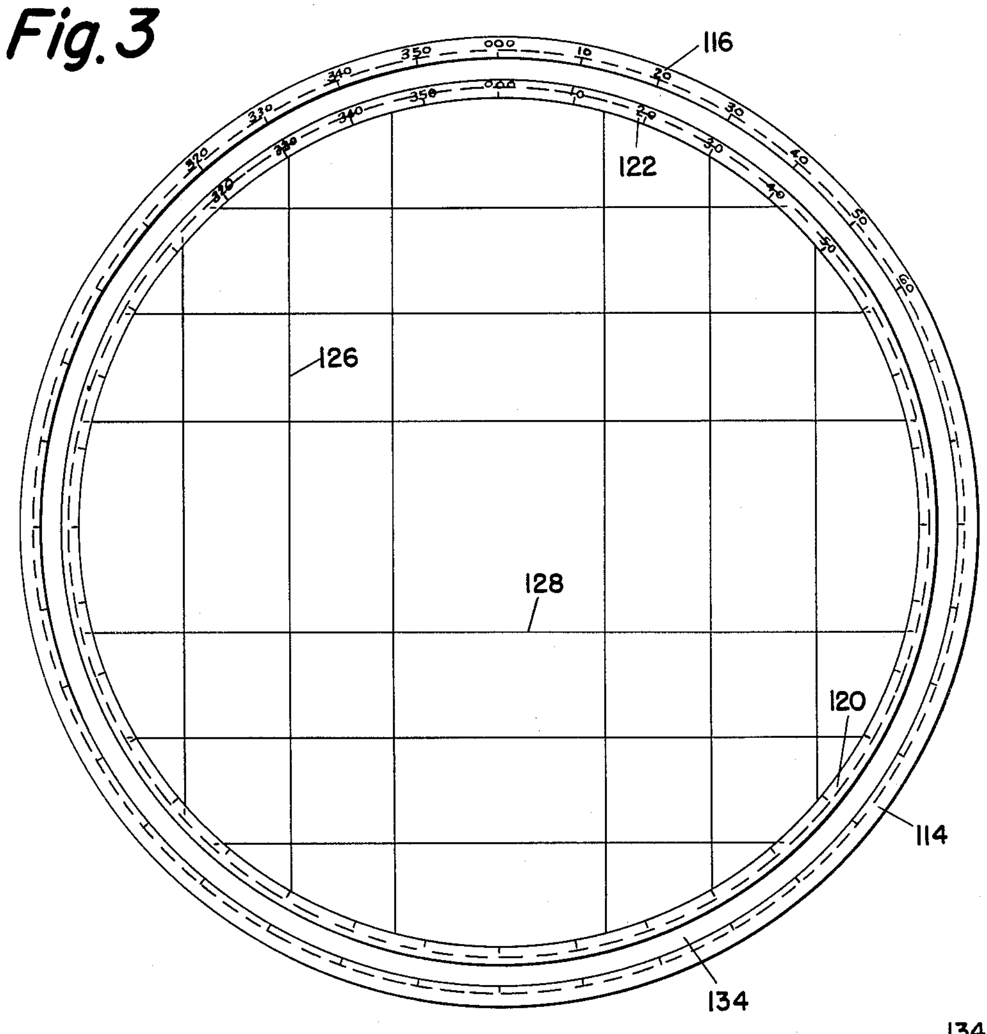
Figure 3 is a top plan view of a modified form of the device with the vector bars removed.

Before proceeding with a discussion of the manner of using the device in the solution of several important relative motion problems, reference will be made to Figures 1–12 for a description of the details of construction of the device. While the device may be fabricated of any suitable materials, it is preferred that, with the exception of the pins, nuts and bushing, it be made of a suitable plastic, preferably one that may be extruded for purposes of economy.

In the form of the invention shown in Figures 1, 2 and 5–12, the device comprises a circular base member 10 having an upstanding peripheral wall 12 which is an inverted L in vertical cross-section providing thereby an inwardly extending flange 14 on the upper surface of which appears a circumferential bearing degrees scale 16 from 000° to 360°. Mounted for rotation on the base plate is a transparent circular face plate 18, the mounting being effected by a slidable bushing or grommet 20, preferably of brass. The face plate is of step construction 22 in vertical cross section which cooperates with the peripheral wall 12 of the base member to form a circumferential groove 24 of inverted T configuration and for a purpose soon to appear.

The above described device is a hand model and therefore includes a circular information chart 26 coextensive with the face plate, which chart is interposed between the face plate and base member and which is rotatable with the face plate. The chart includes adjacent its margin a circumferential bearing degrees scale 28 from 000° to 360°, a zero index 30 and a series of radial lines 32. The chart also includes a plurality of concentric circles 34 equally spaced to represent distances from the center of the device, such as one mile or any other convenient distance for each concentric circle. Etched on the undersurface of the face plate or sketched on the chart are rectangular grid lines including lines 36 parallel to the 000°–180° axis and lines 38 parallel to the 90°–270° axis. The grid lines are spaced to represent distances bearing a distinct relation to the scale markings on the vector bars as will appear hereinafter.

The device is essentially a three vector analyzer and hence contains three slidably interconnected bars. The first is a relative motion bar 40 of length equal at least to, but preferably greater than, the diameter of the base member. The bar is slidably mounted on the device to assume any predetermined position across the face plate. The means effecting this slide mounting comprises a longitudinal slot through the bar 42 equal at least to, but preferably somewhat longer than the inner diameter of the scale-bearing flange 14 of the base member. Coextensive with the slot 42 are upper and lower spaced tracks 44 and 46 opening into the slot for a purpose later to appear. Opposed inverted T bolts or riders 48 and 50 are provided, each having a lower head 52 and reduced shank 54 slidably engaged in the circumferential inverted T groove 24. Each T bolt also includes a reduced stem 56 freely extending through the slot 42 of the relative motion bar.

A means is provided to releasably lock the relative motion bar in any predetermined position across the face plate. This means includes internally threaded thumb nuts 58 and 60 engaged on the upper threaded ends 62 of the T bolts 48 and 50.

The second vector bar is the target vessel bar 64 which is somewhat shorter than the relative motion bar 40 but at least equal in length to the diameter of the face plate. The target vessel bar 64 is disposed beneath the relative motion bar 40 and above the face plate. A means is provided slidably interconnecting the bars so that they are movable relative to each other along their longitudinal axes.

This means includes a longitudinal slot 66 through the target vessel bar, said slot terminating immediately adjacent the ends of the bar. A pin 68 is provided having a reduced shank portion 70 extending freely into the slots 66 and 42 of the target vessel and relative motion bars respectively. The pin includes an upper head 72 engaged in the lower track 46 of the relative motion bar and a lower head 78 engaged in a track 80 provided in the target vessel bar, which track 80 is coextensive with the slot 66 and opens into said slot. One end of the slot 66 is enlarged as at 82 for a purpose later to appear.

The third vector bar is the reference vessel bar 84 which is of the same length, shape and construction of the target vessel bar 64. It is disposed above the relative motion bar 40 and is slidably connected thereto by a means which permits the bars to move relative to each other along their longitudinal axes. This means includes a longitudinal slot 86 through the reference vessel bar 84, the slot being of the same relative length as slot 66 in the target vessel bar and including an enlarged portion 88 at one of its ends. Coextensive with the slot 86 is a track 90 opening into the slot 86. A pin 92 is provided which extends freely through the slot 86 and the slot 42 of the relative motion bar 40. The pin includes a head 94 which is engaged in the upper track 44 of the relative motion bar.

A means is provided to releasably lock the reference vessel bar 84 on the relative motion bar 40 and this means comprises an internally threaded thumb nut 96 engaged on the upper threaded end 98 of the pin 92.

A further means is provided for slidably connecting the reference vessel bar 84 to the target vessel bar 64 whereby the bars are movable relative to each other along their longitudinal axes. This means includes a pin 100 having a lower head 102 engaged in the track 80 of the target vessel bar 64, a shank 104 freely extending through the slots 66 and 86 of the respective target vessel and reference vessel bars, and an intermediate head 106 engaged in the track 90 of the reference vessel bar 84.

A means is provided to releasably lock the reference vessel bar on the target vessel bar and this means comprises an internally threaded thumb nut 108 engaged on the upper threaded end 110 of the pin 100.

In the device above-described the target data are taken from a radar console and transposed on the face plate using the chart there beneath for locating the plots. The modified device shown in Figures 3 and 4 differs from this in that it is designed for direct placement on a radar console. Accordingly, it differs from the device shown in Figures 1 and 2 merely with respect to the construction of the base member and face plate.

In this construction the base member is a circular ring 112 which is L-shaped in cross-section, the shorter leg of the L constituting an inwardly extending flange 114 upon the upper surface of which is imprinted a circumferential bearing degrees scale 116 from 000° to 360°. Instead of a face plate, a second ring 118 is provided which is also L-shaped in cross-section, the shorter leg of the L constituting an outwardly extending flange 120 bearing on its upper surface another circumferential bearing degrees scale 122 from the 000 index to 360°.

Embedded in or otherwise carried by the second ring 118 is a rectangular grid 124 of wire or analogous material, which grid includes lines 126 parallel to the 000°–180° axis and lines 128 parallel to the 90°–270° axis. The second ring and grid are rotatable on the first ring since the longer leg 130 of the L of the second ring is slidably mounted upon the longer leg 132 of the L of the first ring. The rings cooperate to form an inverted T circumferential groove 134 for receiving the T bolts or riders 58 and 60 associated with the relative motion bar 40 previously described.

Figure 4:
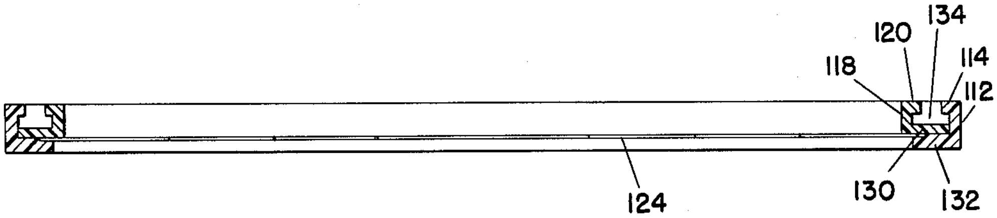
Figure 4 is a diametrical sectional view of the device shown in Figure 3.
Figure 5:
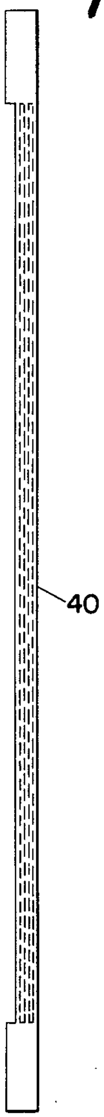
Figure 5 is a side elevational view of the relative motion vector bar per se.
Figure 6:
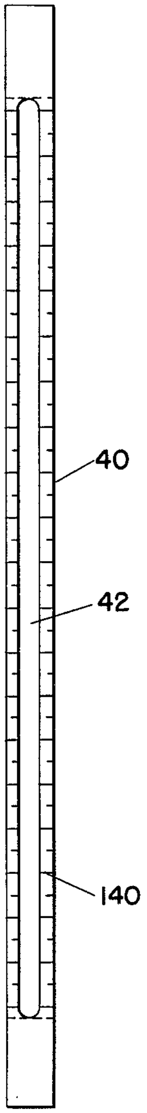
Figure 6 is a face view of said relative motion vector bar.
Figure 7:
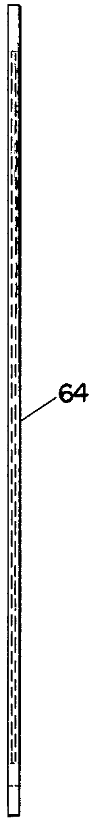
Figure 7 is a side elevational view of the target vessel or reference vessel vector bar, both of said bars being identical.
Figure 8:
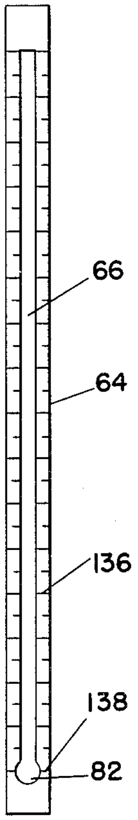
Figure 8 is a face view of the bar shown in Figure 7.
Figure 11:
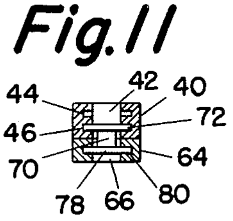
Figure 11 is a sectional view taken on the line 11—11 of Figure 1.
Figure 12:
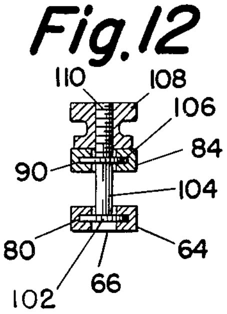
Figure 12 is a sectional view taken on the line 12—12 of Figure 1.
Figure 9:
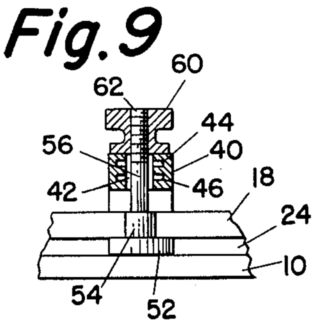
Figure 9 is a sectional view taken on the line 9—9 of Figure 1.
Figure 10:
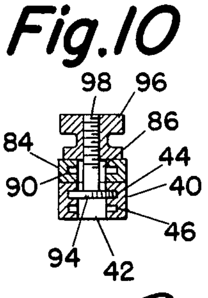
Figure 10 is a sectional view taken on the line 10—10 of Figure 1.
Figure 13:
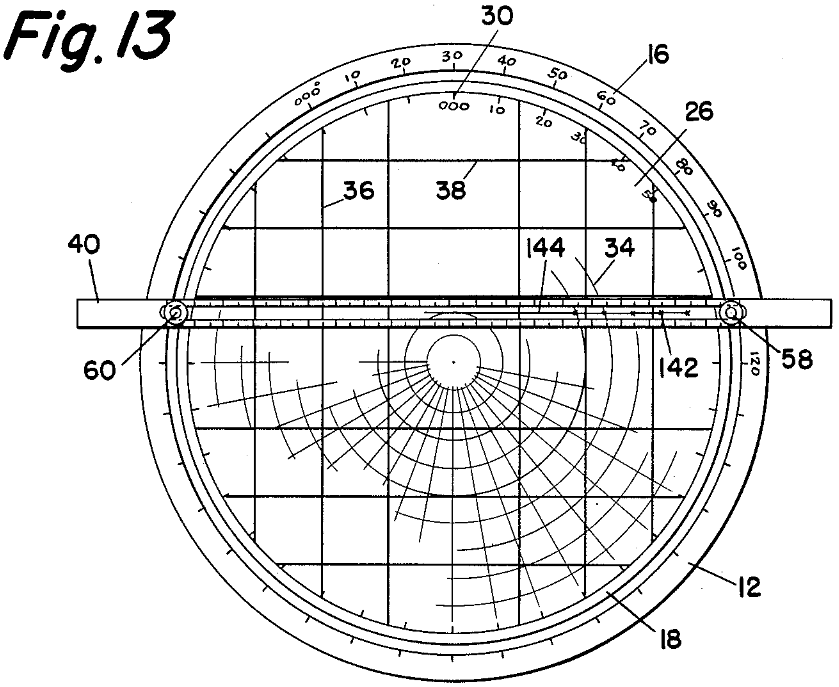
Figure 13 is a diagrammatic face view of the device illustrating the placement of the relative motion bar on a target vessel plot in the solution of one type of relative motion problem, the remaining vector bars being omitted for purposes of clarity.

The modified device may be placed directly over an information source, such as a radar console, containing the concentric circles and radial lines previously described in connection with the chart 26 of the hand model. The target vessel plots may be made directly on the radar console and the vector bars may then be operated as will be described hereinafter. It is possible to further modify the above construction so that the second ring 118 is a transparent circular face plate which either carries or has etched thereon the rectangular grid 124. In this construction the face plate will also be L-shaped in vertical cross-section and mounted on the first ring as shown in Figure 4. It will also be used for placement on a radar console except that the information below the face plate will be marked directly on the upper surface of the face plate.

It should be noted at this point that the target vessel bar 64 and reference vessel bar 84 each contain the same linear distance scale 136, the zero mark 138 of which starts midway of the enlarged portion 82 or 88 of the respective slots 66 and 86 of said bars. The marks are perpendicular to the longitudinal axes of said bars and their separation spacing is equal to one-half the spacing of the concentric circles 34. A similar distance scale 140 may be associated with the relative motion bar 40.

Attention is now called to Figures 13–16 illustrating the solution of a typical problem, namely the ascertainment of the relative motion of a target vessel with respect to the reference or solving vessel assumed to be located at the center of the device. The face plate 18 and chart 26 are rotated so that the zero index 30 points to a marking on the base scale 16, such as 030°, to indicate the true course of the reference vessel. For a given elapsed time at periodic intervals the bearings and distances from the reference vessel of the target vessel are plotted as marks 142, using the base member scale 16 for bearing references and the concentric circles 34 for distance references. With the thumb nuts 58 and 60 loose, the relative motion bar is positioned so that the plots 142 lie along the center line or longitudinal axis of said bar. The line joining the plotted marks 142 may be extended as at 144 to assist in alignment of the relative motion bar and to predict future target passage. The thumb nut is then tightened to fix the predetermined position of the relative motion bar.

Figure 14:
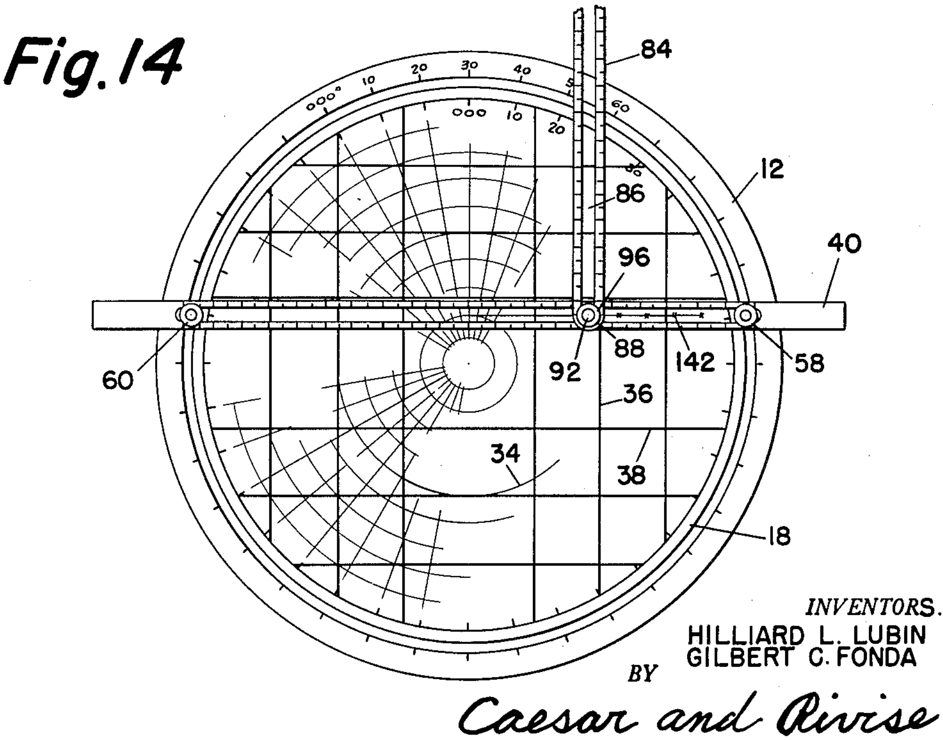
Figure 14 is a view similar to Figure 13 and illustrating the placement of the reference vessel bar in relation to the relative motion bar in the next step of the solution of the same problem, the target vessel bar being omitted for purposes of clarity.

The reference vessel bar 84 is then moved, with the thumb nuts 96 and 108 loosened, so that the pin 92 engaged in the enlarged portion 88 of the slot 86 is over the last plotted mark, with the reference vessel bar extending parallel to the closest 000°–180° grid line 36, as shown clearly in Figure 14. Thumb nut 96 is then tightened to fix the position of the reference vessel bar.

Figure 15:
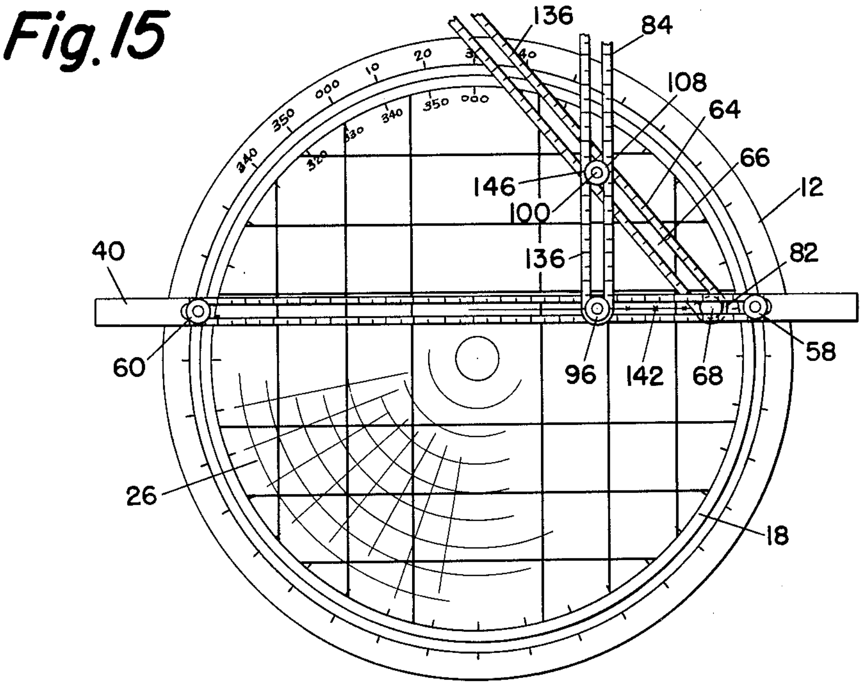
Figure 15 is a view similar to Figure 13 and illustrating the placement of the target vessel bar in relation to the remaining vector bars in the final step of the solution of the same problem.

Then the distance the reference vessel would have travelled in the elapsed plotting time is calculated; thus if the speed of the reference vessel is 15 knots and the elapsed plotting time is 20 minutes, the distance travelled is 5 miles. Knowing this distance, the target vessel bar 64 is moved so that its pin 68 is engaged in its enlarged portion 82 of its slots 66 and the pin is placed over the first of the plotted marks 142 as shown in Figure 15. The pin 100 joining the reference vessel and target vessel bars is then moved to that mark 146 of the scale 136 on the reference vessel bar corresponding to the calculated distance of the reference vessel or, as assumed herein, 5 miles. Thumb nut 108 on pin 100 is then tightened.

At this point the target vessel bar 64 points to its true course and that mark of the scale 136 on the target vessel bar located at the pin 100 indicates the distance, such as 6.6 miles, traversed by the target vessel in the elapsed plotting time of 20 minutes. Thus the comparative speed of the target vessel is 19.8 knots.

Figure 16:
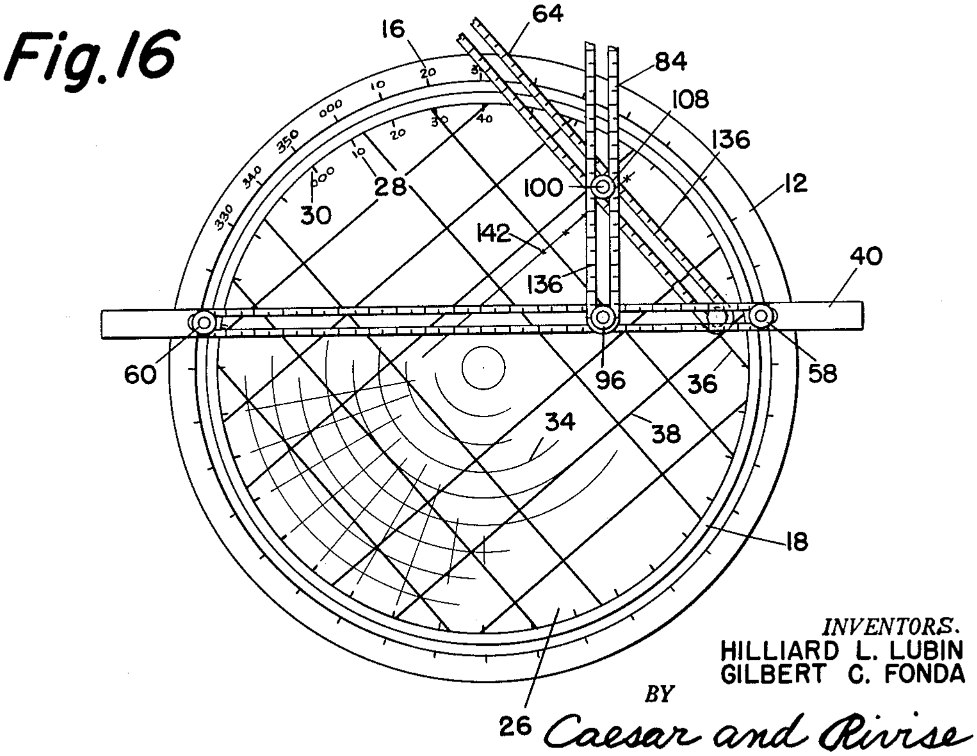
Figure 16 is a view similar to Figure 15 and illustrating the rotation of the face plate to a position indicating the true course of the target vessel.
Figure 17:
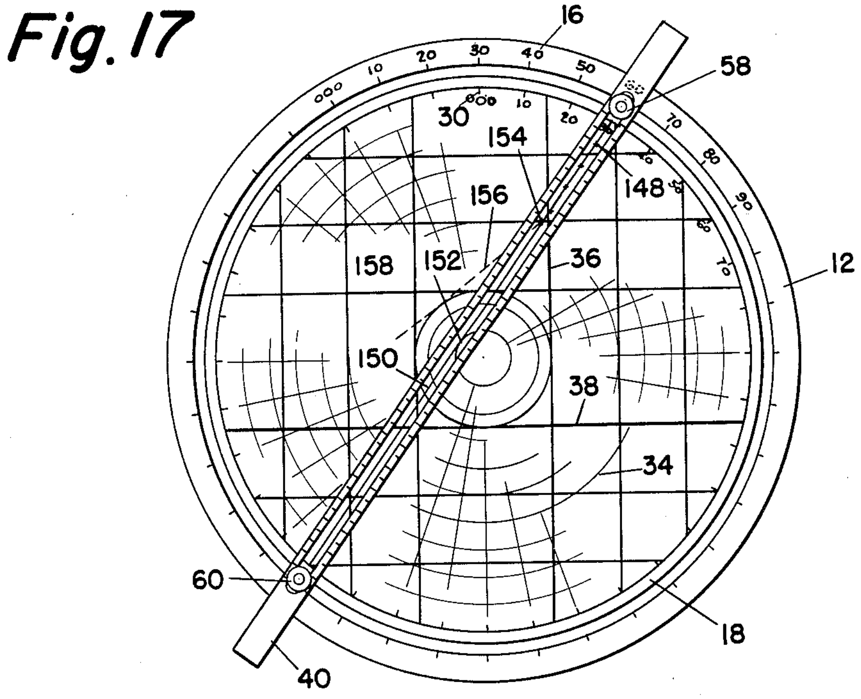
Figure 17 is a diagrammatic face view of the device illustrating the placement of the relative motion bar on a target vessel plot in the solution of a second type of relative motion problem, the remaining vector bars being omitted for purposes of clarity.

To determine the target vessel's course in true degrees, the face plate 18 and chart 26 are rotated so that the closest grid line 36 which is parallel to the 000°–180° axis is also parallel to the target vessel bar 64 as shown in Figure 16. On the outer or base member scale 16 opposite the zero index 30 of the inner circumferential face plate scale 28 is indicated the target vessel's course in true degrees, which as shown in Figure 16 is 350½°.

Coming now to Figures 17–22, there is illustrated thereby the successive steps in the solution of another relative motion problem, namely the determination of a course to be followed by the reference vessel to avoid the target vessel at a predetermined distance. The solution of this problem necessarily involves the solution of a relative motion problem such as previously described.

As described in connection with the first problem, the face plate and chart are rotated so that the zero index 30 points to a mark on the outer or base member scale 16 indicating the course in degrees, such as 030°, of the reference vessel assumed to be at the center of the device. Four plots 148 of the target vessel are marked on the face plate and the center line or longitudinal axis of the relative motion bar 40 is aligned therewith and fixed thereat by thumb nut 58. Extrapolation of the line joining the plotted marks as at 150 indicates that if the reference and target vessels do not change course they will approach each other only 1 mile off as at 152.

Assuming that the reference vessel desires to change its course 3 minutes after the last plot so that the target vessel will pass no closer than 2½ miles, an estimated target plot 154 at 3 minutes after the last plot is marked on the face plate and a line 156 is drawn through said mark and tangent to the 2½ mile concentric circle 158. This is the path the reference vessel desires the target vessel to take relative thereto.

Figure 18:
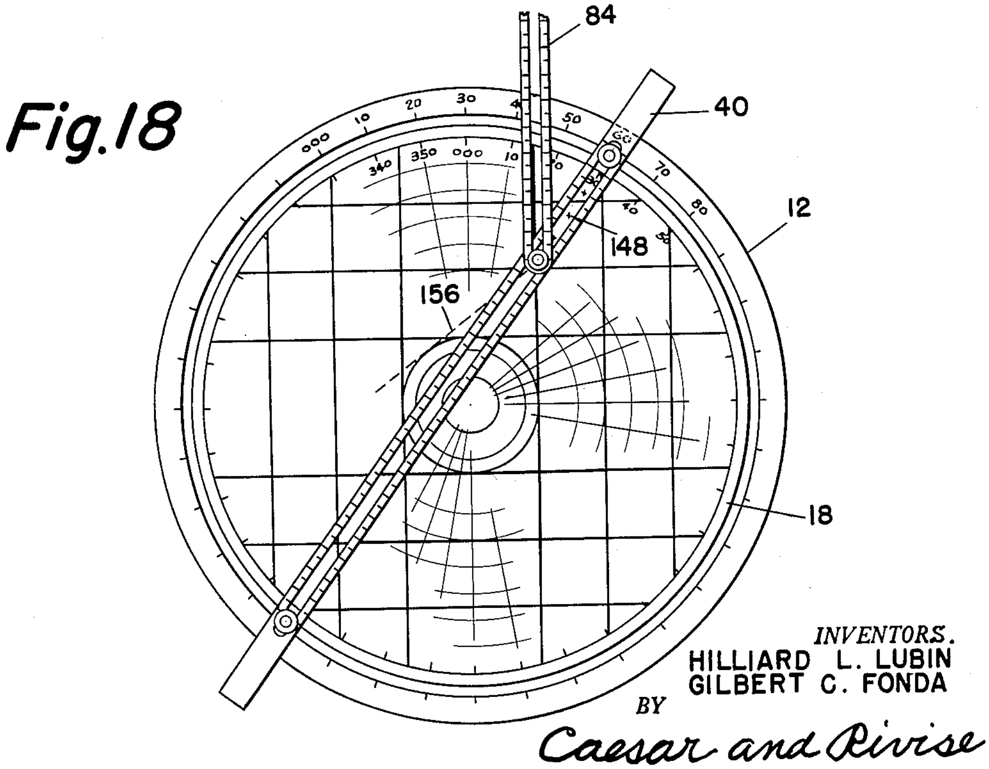
Figure 18 is a view similar to Figure 17 and illustrating the placement of the reference vessel bar in relation to the relative motion bar in the next step of the solution of the same problem, the target vessel bar being omitted for purposes of clarity.
Figure 19:
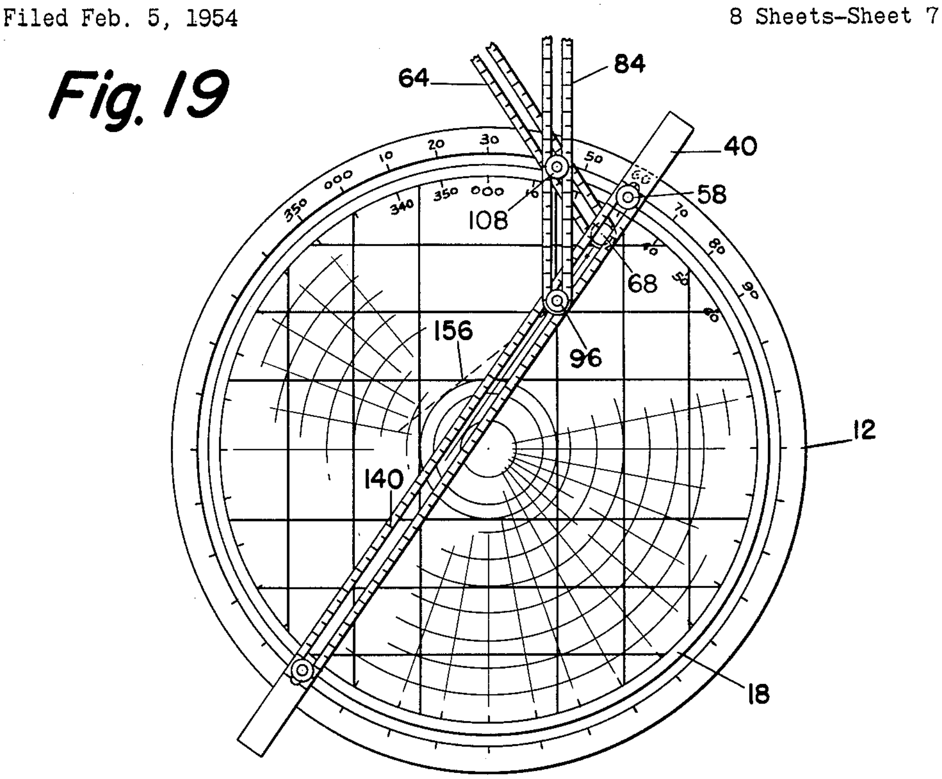
Figure 19 is a view similar to Figure 17 and illustrating the placement of the target vessel bar in relation to the remaining vector bars in the next step of the solution of the same problem.
Figure 20:
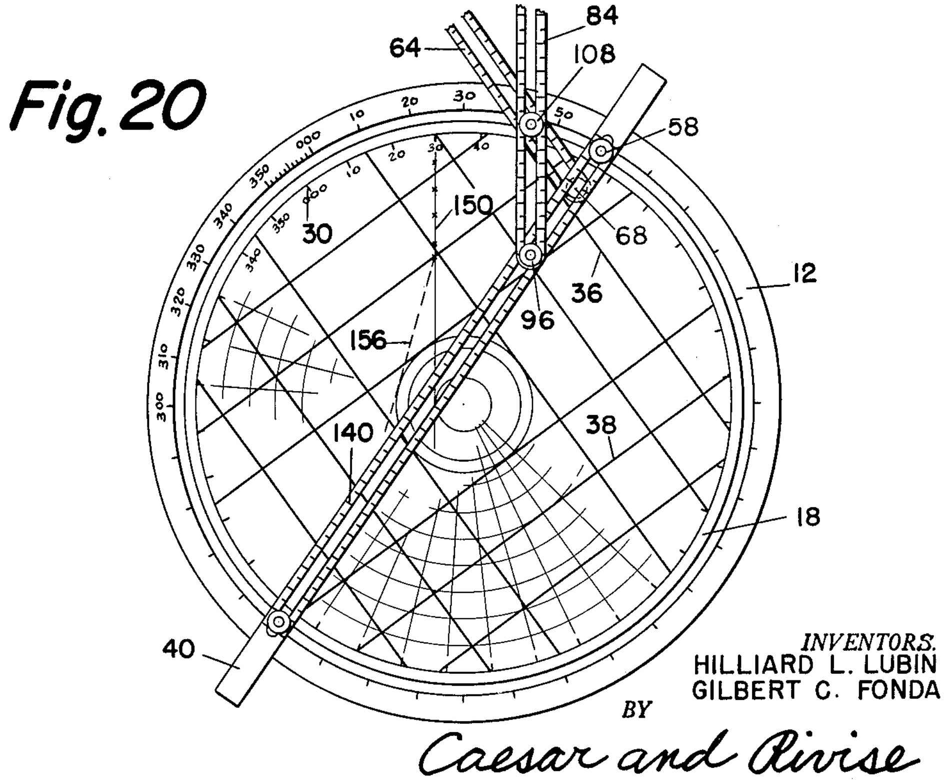
Figures 20, 21 and 22 are views similar to Figure 13 of the device in successive stages leading to the final solution of the same problem.

Thereafter, the reference vessel bar 84 is positioned on the relative motion bar 40, as shown in Figure 18, and the target vessel bar 64 is positioned on both the relative motion and reference vessel bars, as shown in Figure 19, in the same manner as previously described hereabove in connection with Figures 14 and 15 to determine the true course and speed of the target vessel relative to the reference vessel. As described in connection with Figure 16 and as shown herein in Figure 20, the face plate and chart are rotated so that the grid lines 36 are parallel to the target vessel bar 64, at which point the zero index 30 of the inner scale points to a mark on the outer or base member scale indicating the true course in degrees, such as 356°, of the target vessel. By the final position of the target vessel bar as shown in the drawings it will be seen that the distance traversed by the target vessel is 3.1 spaces or miles on the target vessel bar scale in an elapsed time of 20 minutes or 9.3 knots.

Figure 21:
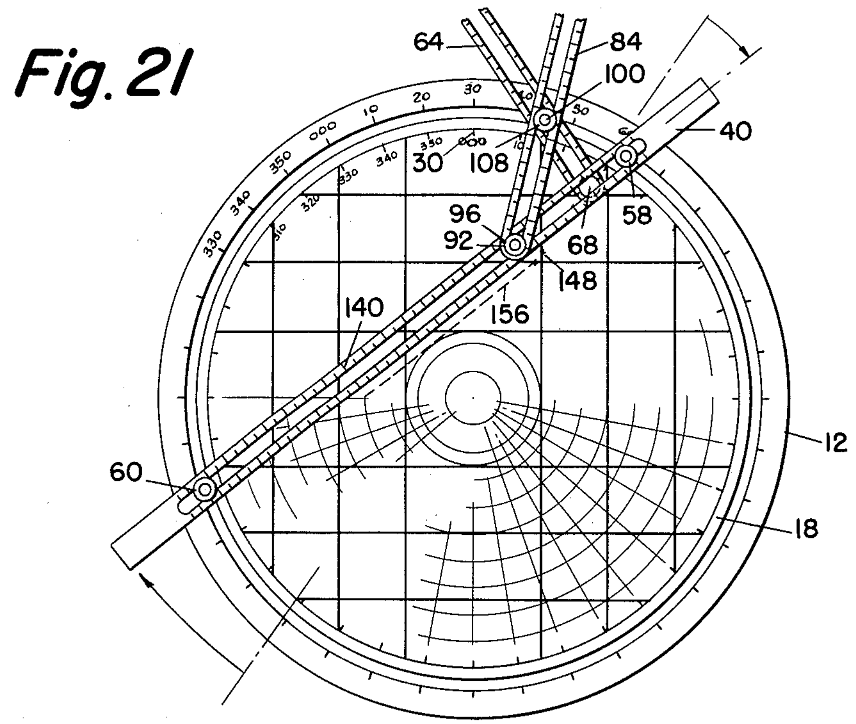

The face plate is then rotated back to its former position as shown in Figure 19. Thumb nuts 58 and 108 are loosened slightly to permit forced movement. Thumb nut 96 is completely loosened to permit free sliding movement of reference vessel bar 84 in the slot of relative motion bar 40. Holding target vessel bar 64 against the base member 12 so that it maintains position with respect to the base member, relative motion bar 40 is slowly rotated about pin 68 so that it lies parallel to the desired relative motion line 156 as shown in Figure 21. The thumb nuts are now tightened and the final position of reference vessel bar 84 shows the course the reference vessel must come to in order to arrive at the desired results.

Figure 22:
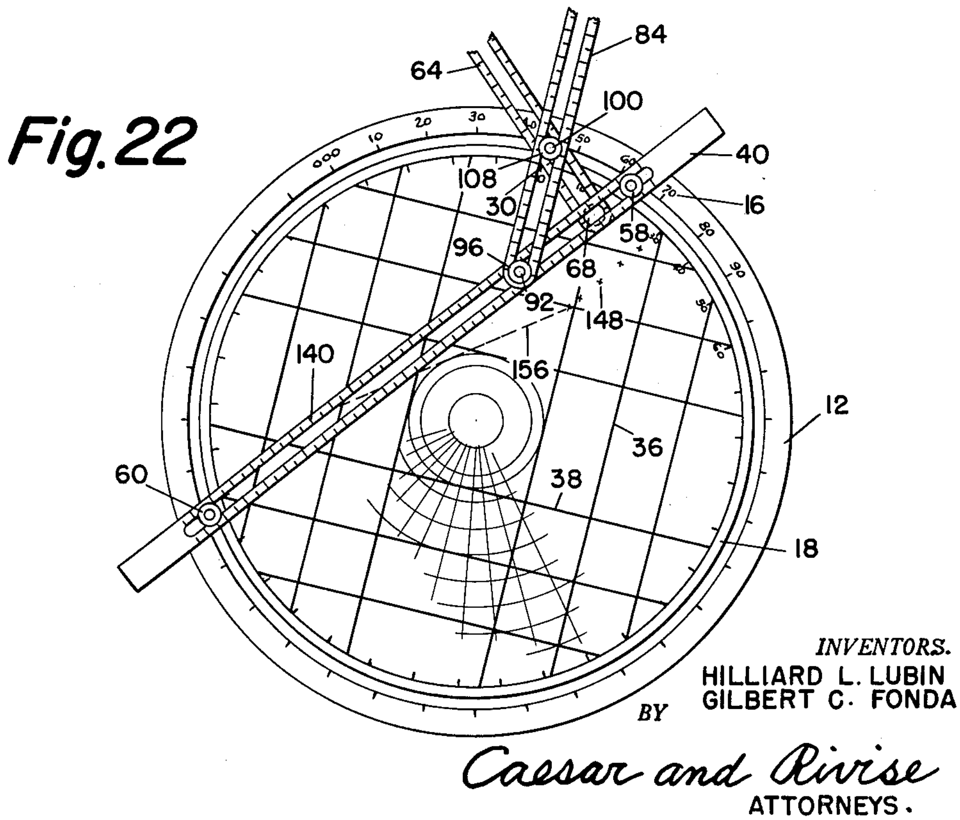

Rotation of the face plate and chart so that the grid lines 36 lie parallel to the reference vessel bar 84, as shown in Figure 22, will move the chart zero index 30 to a mark on the outer scale 16 of the base member, indicating the desired course in degrees, here shown as 044½°. Since reference vessel bar 84 rotated around pin 100 in arriving at its final position, the vector distance between pins 92 and 100 did not change, indicating no speed change for the reference vessel.

The final position of the vector bars in the solution of the above-described target-avoidance relative motion problem supplies additional useful information as follows:

1. Note that relative motion bar 40 in this problem is provided with linear scale markings 140. Previous first-last plot separation was about 3.2 ring spaces or miles, as seen on the scale 140 of the relative motion bar between pins 68 and 92 in Figures 19 and 20. Present spacing between these pins in the final positions of the bars is about 3.75 ring spaces, showing the exact increase in relative speed between the reference and target vessels by the course change on the part of the reference vessel.

2. The final positions of the bars indicate that if the reference vessel desired to accomplish the maneuver at a higher speed (greater spacing between pins 92 and 100), the final course would be further to the right of determined bearing of reference vessel, namely 044½°, and vice versa.

3. If the maneuver were to be based on elapsed time in movement, alteration of the positions of pins 68 or 92 relative to pin 100 to suit the time desired would solve the problem on that basis.

4. If a different course from that determined for the reference vessel were desired, rotation of the reference vessel bar 84 about pin 100 and in the slot of the relative motion bar 40 would automatically determine the speed necessary to accomplish this maneuver as a result of the new spacing between pins 92 and 100.

At this point attention is called to the fact that the present device can solve the above-described relative motion problems based either on a true or relative basis by simply changing the reference scales for the initially plotted marks. Where true presentation is required, the zero index 30 on the inner bearing scale 28 would represent the ship's bow and it would of necessity point to the reference ship's true course on the outer scale 16. When the face plate 18 and associated chart 26 are rotated so that the grid lines 36 are parallel to the target ship bar 64 in its final position, the zero index 30 on the inner bearing scale 28 would point to the target ship's true course on the outer scale 16. When using this method, the initial target plots 142 are put on the face plate 18 with reference to the true bearings on the outer scale 16. If the officer desires to plot with reference to his ship's head, as many merchant mariners do, he would put his plots on the face plate 18 with reference to the bearings on the inner scale 28. Either method provides the same answer.

Thus it will be seen that a relative motion analyzer is provided which permits the problem to be solved where it is happening with respect to the reference or solving vessel without displacing the solution from the problem in contra-distinction to the devices of the prior art wherein one or more of the vector arms is pivoted about the center of each of said devices where the problem is not happening.

Although the utility of the present invention has been described hereabove in connection with the solution of two relative motion problems, it will be understood by skilled artisans that many more problems may be solved thereby since the invention is essentially a three vector analyzer, the three vector arms of which are adjustably and slidably interconnected for movement along their longitudinal axes. Moreover, minor variations in the construction and arrangement of parts may be made by skilled artisans without departing from the spirit of the invention and the scope of the appended claims.

We claim:

1. A relative motion analyzer comprising a circular base member having a circumferential degree calibrated scale adjacent its margin, a transparent face plate rotatably mounted on said base plate and having a margin terminating short of the base plate margin to provide a circumferential groove, a chart rotatable and coextensive with said face plate and mounted therebeneath, said chart including markings comprising a circumferential degree calibrated scale including a zero index and adjacent its margin, concentric circles equally spaced to represent predetermined distances from the center of rotation of the face plate and rectangular grid lines including lines parallel to the 000°–180° axis and lines parallel to the 270°–090° axis, a relative motion bar extending across the face plate including an elongated slot, riders extending through said slot and slidably engaged in the circumferential groove and means associated with the riders to releasably lock the relative motion bar in a predetermined position, a target vessel bar extending across the face plate beneath the relative motion bar and including an elongated slot, a pin engaged in the slots of the relative motion bar and the target vessel bar slidably interconnecting said bars, a reference vessel bar extending across the face plate above the relative motion bar and including an elongated slot, a first pin slidably interconnecting the relative motion bar and the reference vessel bar through their respective slots, a second pin slidably interconnecting the reference vessel bar and the target vessel bar through their respective slots, means associated with the first and second pins to releasably lock the reference vessel bar in a predetermined position relative to the target vessel and relative motion bars, and a distance scale on each of the target vessel and reference vessel bars.

2. A relative motion analyzer comprising a circular base member having a circumferential degree calibrated scale adjacent its margin, a transparent face plate rotatably mounted on said base plate and having a margin terminating short of the base plate margin to provide a circumferential groove, a chart rotatable and coextensive with said face plate and mounted therebeneath, said chart including markings comprising a circumferential degree calibrated scale including a zero index and adjacent its margin, concentric circles equally spaced to represent predetermined distances from the center of rotation of the face plate and rectangular grid lines including lines parallel to the 000°–180° axis and lines parallel to the 270°–090° axis, a relative motion bar equal in length at least to the diameter of the base member, a first means carried by the relative motion bar and slidably engaged in the circumferential groove, releasable locking means associated with said first means, an elongated target vessel bar beneath the relative motion bar, a second means slidably interconnecting the target vessel bar and the relative motion bar so that the bars are movable relative to each other along their longitudinal axes, an elongated reference vessel bar above the relative motion bar, a third means slidably interconnecting the reference vessel bar with the relative motion bar and the target vessel bar so that the three bars are movable relative to each other along their longitudinal axes, releasable locking means associated with said third means, and a distance scale on each of the target vessel and reference vessel bars.

3. The combination of claim 2 wherein said first means includes a longitudinal slot through the relative motion bar and headed bolts engaged in the circumferential groove and extending through said slot and the releasable locking means therefor includes nuts engaged on said bolts.

4. The combination of claim 3 wherein said second means includes a longitudinal slot through the target vessel bar, a longitudinal track in the target vessel bar opening into the slot thereof, a lower longitudinal track in the relative motion bar and opening into the slot thereof, and a double headed pin extending into said slots, the heads thereof being engaged in said tracks.

5. The combination of claim 4 wherein said third means includes a longitudinal slot through the reference vessel bar, a longitudinal track in the reference vessel bar opening into the slot thereof, an upper longitudinal track in the relative motion bar spaced from the lower track and opening into the slot thereof, a first headed bolt engaged in the upper track of the relative motion bar and extending through the slot of the reference vessel bar, and a second bolt having a lower head engaged in the track of the target vessel bar and an intermediate flange engaged in the track of the reference vessel bar, the upper threaded end of said second bolt extending through the slot of the reference vessel bar, said last-mentioned releasable locking means including nuts received on the upper threaded ends of the first and second bolts.

6. A relative motion analyzer comprising a circular base member having a circumferential degree calibrated scale adjacent its margin, a transparent face plate rotatably mounted on said base plate and having a margin terminating short of the base plate margin to provide a circumferential groove, a chart rotatable and coextensive with said face plate and mounted therebeneath, said chart including markings comprising a circumferential degree calibrated scale including a zero index and adjacent its margin, concentric circles equally spaced to represent predetermined distances from the center of rotation of the face plate and rectangular grid lines including lines parallel to the 000°–180° axis and lines parallel to the 270°–090° axis, the zero index of said chart being adapted for alignment with the marking of the base member scale to indicate the bearing of the reference vessel assuming the latter to be located at the center of the chart, an elongated relative motion bar having means adapted to be selectively released and locked, said means being slidably engaged in said circumferential groove, said bar being adapted for alignment along its longitudinal axis with a series of target vessel plots on the chart, an elongated reference vessel bar disposed above said relative motion bar, a first pin slidably interconnecting said relative motion bar and said reference vessel bar so that the bars are movable relative to each other along their longitudinal axes, releasable locking means associated with said first pin, said pin being adapted for locking at the last target vessel plot while the reference vessel bar extends parallel to the 000°–180° grid lines, an elongated target vessel bar beneath said relative motion bar, a second pin slidably interconnecting said target vessel bar with said relative motion bar so that said bars are movable relative to each other along their longitudinal axes, a third pin slidably interconnecting said target vessel bar with said reference vessel bar so that said bars are movable relative to each other along their longitudinal axes, a releasable locking means for said third pin, each of said target vessel and reference vessel bars including a distance scale, said second pin being adapted for location at the first target vessel plot, said third pin being adapted to be locked at the mark of the distance scale on the reference vessel bar representing the calculated distance covered by the reference vessel in the elapsed plotting time, the mark on the distance scale of the target vessel bar at said third pin constituting the distance traveled by the target vessel in the elapsed plotting time from which the rate of speed of the target vessel can be calculated, rotation of the face plate and chart so that the 000°–180° grid lines are parallel to the target vessel bar moving the zero index of the chart to a mark on the base member scale indicating the true course in degrees of the target vessel.

7. A relative motion analyzer comprising a first circular ring having a circumferential degree calibrated scale on its upper face, a second circular ring of smaller diameter than the first ring and rotatably mounted on the latter, said second ring also including a circumferential degree calibrated scale on its upper surface including a zero index, a rectangular grid carried by said second ring, said first and second rings cooperating to form a circumferential groove, an elongated relative motion bar including opposed riders slidably engaged in said groove, means associated with said riders to releasably lock said relative motion bar in any predetermined position across said rings, an elongated target vessel bar beneath said relative motion bar, means slidably interconnecting said target vessel and relative motion bars so that said bars are movable relative to each other along their longitudinal axes, an elongated reference vessel bar above said relative motion bar, a first pin means slidably interconnecting said reference vessel and relative motion bars so that said bars are movable relative to each other along their longitudinal axes, a first means associated with said first pin means to releasably lock the same at a predetermined position, a second pin means slidably interconnecting said reference vessel and said target vessel bars so that said bars are movable relative to each other along their longitudinal axes, a second means associated with said second pin means to releasably lock the same at a predetermined position, and distance scales on each of said target and reference vessel bars, said rings and bars being adapted for placement as a unit over an information source including concentric circles equally spaced to represent predetermined distances from a center point.

8. The combination of claim 7 wherein said rings are L-shaped in cross-section, the longer leg of the L of the second ring rotatably bearing on the longer leg of the L of the first ring, the shorter legs of the L of both rings opposing each other to form an inverted T-shaped circumferential groove.

9. The combination of claim 8 wherein said riders include inverted T-bolts engaged in said inverted T-shaped circumferential groove and said means to releasably lock said relative motion bar includes thumb nuts engaging the free ends of said inverted T-bolts.

10. The combination of claim 7 wherein said means slidably interconnecting said target and relative motion bars includes a longitudinal slot in each of said bars, a longitudinal track opening into each of said longitudinal slots and a double headed pin extending into said slots with the heads engaged in said tracks.

11. The combination of claim 7 wherein said first pin means slidably interconnecting said reference vessel and relative motion bars includes a longitudinal slot in each of said bars, a longitudinal track opening into the slot of said relative motion bar and spaced above said means slidably interconnecting said relative motion bar with said target vessel bar, and a threaded pin having a head engaged in said track and extending through said slots, said first means to releasably lock said first pin means including a thumb nut engaging said threaded pin.

12. The combination of claim 7 wherein said second pin means slidably interconnecting said reference vessel and target vessel bars includes a longitudinal slot in each of said bars, a longitudinal track opening into each of said slots and a pin having an upper threaded end, a lower head engaged in the track of said target vessel bar and an intermediate flange engaged in the track of said reference vessel bar, said second means to releasably lock said second pin means including a thumb nut engaging the upper threaded end of said pin.

13. A relative motion analyzer comprising a circular base member and a circular transparent face plate rotatable thereon, said base member and plate including corresponding circumferential degree calibrated scales, a chart between said base member and said face plate and rotatable with the latter, said chart including indicia for plotting the course of a target vessel relative to the reference vessel located at the center of rotation, an elongated relative motion bar of length equal at least to the diameter of said base member, means to releasably lock said relative motion bar in any predetermined position across said face plate along the plotted course of the target vessel, an elongated target vessel bar beneath said relative motion bar and slidably connected thereto for movement along its own longitudinal axis and that of said relative motion bar, an elongated reference vessel bar above said relative motion bar and slidably connected to said latter bar and said target vessel bar for movement along its own longitudinal axis and along the longitudinal axes of said relative motion and target vessel bars, and means to releasably lock said reference vessel bar relative to the other bars with reference to the chart indicia whereby said target vessel bar will assume a position indicating the relative motion vector of the target vessel.

References Cited in the file of this patent

UNITED STATES PATENTS

| | | |
|---|---|---|
| 1,538,825 | Kooiman | May 19, 1925 |
| 1,843,978 | Hensey | Feb. 9, 1932 |
| 2,099,713 | Willson | Nov. 23, 1937 |
| 2,419,203 | Edwards | Apr. 22, 1947 |
| 2,576,149 | Sharp | Nov. 27, 1951 |